(12) United States Patent
Brielmann et al.

(10) Patent No.: US 8,282,824 B2
(45) Date of Patent: Oct. 9, 2012

(54) FUEL FILTER FOR MOTOR VEHICLES

(75) Inventors: Volker Brielmann, Freiberg am Neckar (DE); Carlos J. Blasco Remacha, Azuqueca de Henares (ES); Miguel Granda, Madrid (ES); Matthias Gaenswein, Esslingen (DE); Vasco Gomes Gama, Madrid (ES)

(73) Assignee: Robert Bosch GmbH, Stuttgart (DE)

( * ) Notice: Subject to any disclaimer, the term of this patent is extended or adjusted under 35 U.S.C. 154(b) by 1082 days.

(21) Appl. No.: 11/813,237

(22) PCT Filed: Dec. 19, 2005

(86) PCT No.: PCT/EP2005/056905
§ 371 (c)(1),
(2), (4) Date: Jun. 27, 2008

(87) PCT Pub. No.: WO2006/072545
PCT Pub. Date: Jul. 13, 2006

(65) Prior Publication Data
US 2011/0155656 A1 Jun. 30, 2011

(30) Foreign Application Priority Data
Jan. 4, 2005 (DE) .......................... 10 2005 000 658

(51) Int. Cl.
*B01D 29/88* (2006.01)
*B01D 35/30* (2006.01)
*B01D 36/04* (2006.01)
*F02M 37/22* (2006.01)

(52) U.S. Cl. ........ 210/248; 210/232; 210/114; 210/266; 210/295

(58) Field of Classification Search ................. 210/232, 210/248, 321.84
See application file for complete search history.

(56) References Cited

U.S. PATENT DOCUMENTS

| | | | |
|---|---|---|---|
| 5,645,718 A * | 7/1997 | Hardison et al. | 210/232 |
| 5,667,678 A | 9/1997 | Dye et al. | |
| 5,817,234 A | 10/1998 | Dye et al. | |
| 5,904,844 A | 5/1999 | Stone | |
| 7,850,846 B2 * | 12/2010 | De La Azuela et al. | 210/295 |

FOREIGN PATENT DOCUMENTS

| | | | |
|---|---|---|---|
| CN | 1232407 A | | 10/1999 |
| DE | 10138695 | * | 2/2003 |
| DE | 10138695 A1 | | 2/2003 |
| DE | 69732032 T2 | | 11/2005 |

* cited by examiner

*Primary Examiner* — Benjamin Kurtz
(74) *Attorney, Agent, or Firm* — Maginot, Moore & Beck

(57) ABSTRACT

A fuel filter having a filter element for filtering out particles and water from a fuel flowing through the fuel filter and having a water drainage unit for conveying filtered-out water out of the fuel filter, in which the water drainage unit is embodied as a stand-alone unit that may be separated from the filter element as needed. Also a semipermeable membrane that is permeable to water rests flat on a support. Alternatively or in addition, the water drainage unit is provided with a porous element for the evaporation of the separated water. In another embodiment two water-permeable semipermeable and hydrophilic membranes are provided. Finally, the filter element is embodied essentially in the form of a hollow cylinder in which at least part of the water drainage unit may be situated on the interior of the hollow cylinder.

5 Claims, 3 Drawing Sheets

FUEL FILTER FOR MOTOR VEHICLES

CROSS-REFERENCE TO RELATED APPLICATION

This application is a 35 USC 371 application of PCT/EP 2005/056905 filed on Dec. 19, 2005.

BACKGROUND OF THE INVENTION

1. Field of the Invention

The invention relates to a fuel filter with a filter element for filtering out particles and water from a fuel flowing through the fuel filler, and a water drainage unit for removing the filtered-out water from the filter.

2. Description of the Prior Art

In motor vehicles that are driven by a diesel engine, for example, fuel filters of the type mentioned above are used to filter out particles and water contained in the diesel fuel. The fuel is filtered to prevent malfunctions or damage such as corrosion from occurring, particularly in an injection system of the associated engine. Such damage can be caused by water residue in the fuel.

For the above-mentioned reason, a maximum permissible percentage of water in diesel fuel of less than 200 mg/l is codified in DIN EN 590. In order to achieve such a limit value, conventional fuel filters are equipped with a filter element that holds back particles and separates out water from the flowing fuel. The separated water travels into a water drainage unit, which is impassible to the actual fuel. In the water drainage unit, underneath the filter element, a sump is often provided, in which the water separated out from the fuel can collect. The water that collects in the sump must be emptied regularly, for which purpose special outlet- or valve elements must be provided.

DE 101 38 695 A1 has disclosed a device for drawing water from the fuel system of an internal combustion engine in which the separated water is collected in a sump until a water sensor detects a minimum level of water. Then a shut-off device is opened through which the water can be discharged or conveyed to a second water drainage unit. A disadvantage of this embodiment is that if the water sensor malfunctions, then the water is never emptied from the water drainage unit of the fuel filter. Aside from this susceptibility to malfunction, this embodiment is also comparatively expensive since it requires a water sensor, a shut-off device, and associated control electronics.

JP 61-216701 has also disclosed a fuel filter in which a water drainage unit is situated underneath a filter element. The membrane of the water drainage unit is clamped between two housing parts of the fuel filter so as to achieve a closed structural unit. As a result, the water drainage unit is situated on the clean side of the filter element.

JP 64-11609 has disclosed an automatic water separation device for a fuel supply system in which a water drainage unit situated underneath a filter element is embodied with a first hydrophilic membrane and a hydrophobic membrane situated downstream of it in the flow direction of the separated water.

SUMMARY AND ADVANTAGES OF THE INVENTION

The object of the present invention is to create a fuel filter with a filter element and a water drainage unit of the type mentioned at the beginning, which offers cost advantages in comparison to known systems, for example in the production or subsequent maintenance of the associated fuel supply system.

The object is attained according to the invention with a fuel filter of the type in which the water drainage unit is embodied in the form of a stand-alone structural unit, which can optionally be separated from the filter element. In other words, the water drainage unit is not integrated into the housing of the filter element or of the overall fuel filter, but is instead embodied in the form of a stand-alone module, for example in the form of a replaceable insert, which can be replaced as needed. Thus the water drainage unit according to the present invention can be separated from the filter element, for example at freely selectable replacement intervals, and cleaned if needed. In the event of damage, the water drainage unit can be easily replaced, with the option of leaving the filter element of the fuel filter in place for further use. With a corresponding embodiment of the water drainage module, it is possible, by removing the replaceable insert on the fuel filter, to give access to the filter element in such a way that the filter element can also be replaced if so desired. Furthermore, the filter element can also constitute a stand-alone module, which is in turn coupled to the connection module and provided with the water drainage module.

In order to achieve the above-mentioned advantages, it is also possible for the water drainage unit to be advantageously embodied with its own housing, which can be coupled to the housing of the filter element. The coupling can, for example, be executed by means of a decent or screw connection that is provided with a correspondingly embodied seal. Alternatively, the water drainage unit, which is embodied in the form of a module according to the present invention, can be connected to the associated filter element via a line such as a tube or hose. With an embodiment of this kind, the fuel filter can be distributed to two sections in the installation space of an associated motor vehicle, each of which did not each previously contain enough space for a conventional fuel filter.

The object according to the present invention is also attained in a particularly advantageous fashion with a fuel filter of the type in which a semipermeable membrane that permeably separates out the water and rests flat against a support. In comparison to known membranes, a disk-shaped membrane arranged in this way can be embodied as particularly thin and of a material that would not by itself have the required stability, but does have properties that are particularly advantageous for the desired separation of water. Among others, these properties also include a hydrophilic surface of the material. In addition to the above-mentioned mechanical stabilization of the water-separating membrane, the support mentioned above also serves as a crash guard in the event of an accident.

The object is also attained in a particularly advantageous fashion according to the invention with a fuel filter in which the water drainage unit is provided with a porous element for evaporating the discharged water. In such a water drainage unit according to the present invention, the discharged water is not discharged by means of a shut-off device or conveyed to a second water drainage unit, but is instead conveyed directly to a porous element in which it is evaporated and is thus removed from the water drainage unit. This makes it possible to achieve an "automatic" water drainage that is particularly advantageous in terms of manufacturing and operating costs. The porous element advantageously has a comparatively large area, e.g. is embodied in the form of a disk that has a comparatively high stability and, as mentioned above, can serve as a crash guard.

The porous element, which is provided in this way according to the present invention and is for evaporating the separated water, can also be advantageously embodied in such a way that the porous, semipermeable membrane rests directly against it and the element thus constitutes a support that supports the membrane, mechanically stabilizes it, and serves as a crash guard. A porous element of this kind thus performs multiple functions.

The water drainage unit of the fuel filter according to the present invention is preferably embodied with a housing, which is open toward the outside in the region of the porous element. The open region permits a direct air circulation around the porous element, which advantageously influences an evaporation of the water at the porous element particularly due to both the relatively high temperature prevailing in an engine compartment of a motor vehicle and the powerful air movement (especially when driving). In the installed position, the section of the water drainage unit that is open to the outside should advantageously be situated on its underside. This largely prevents dirt or impurities from settling on the outside of the porous element; the entire design also advantageously results in the fact that water to be evaporated collects above the membrane and the porous element situated underneath it before then being evaporated by the latter.

In order to permanently prevent fuel from escaping through the membrane or the porous element in the fuel filter according to the invention, the porous element should be situated in an accident-protected holder. It is particularly advantageous for a holder of this kind to be provided with a water drainage unit, which is embodied as a stand-alone module. The module or water drainage unit can thus be provided, for example, with a correspondingly stable external housing that is coupled to a housing of the filter element in such a way that in the event of an accident, it is in fact possible for a slight deformation of the individual components to occur, but not for the porous element contained in the housing to burst.

The danger of an escape of fuel from the fuel filter according to the invention can also be advantageously reduced by embodying the water drainage unit with two semipermeable and hydrophilic membranes that are permeable to water. The water to be separated out then first passes through one of the hydrophilic membranes and travels into an intermediate space, which is situated between the two hydrophilic membranes and from which it can only escape through the second hydrophilic membrane. In the event of an accident, if one of the two hydrophilic membranes bursts, then the overall system is redundantly designed so that the second hydrophilic membrane reliably prevents an escape of fuel.

In order to further increase the reliability of the overall system, a sensor can advantageously be provided in order to detect fuel residues in the space formed between the two membranes. The sensor detects whether a failure occurs in the first hydrophilic membrane through which the water must pass and thus a situation in which fuel particles could travel into the intermediate space. Should such a failure be detected, then this can be remedied, for example by a simple replacement of the water drainage unit, which, according to the invention, is embodied as a stand-alone module. A replacement of the associated filter element is not required in such a repair.

Particularly in motor vehicles, there is an ever-increasing demand for vehicle components to take up the least amount of space possible. In order to meet this demand, a fuel filter is advantageously embodied so that its filter element is essentially the shape of a hollow cylinder and at least part of its water drainage unit is situated inside the hollow cylinder.

Such an arrangement of the filter element in a fuel filter can be used to particular advantage in combination with a water drainage unit that is situated on the clean side of the filter element. An arrangement on the clean side of the filter element largely prevents particles contained in the fuel from contaminating the membrane of the water drainage unit because such particles have already been filtered out as the fuel flows through the filter element.

BRIEF DESCRIPTION OF THE DRAWINGS

Exemplary embodiments of a fuel filter according to the invention, equipped with a filter element and a water drainage unit, will be explained in detail below in conjunction with the accompanying schematic drawings, in which.

DESCRIPTION OF THE PREFERRED EMBODIMENTS

Figure 1:
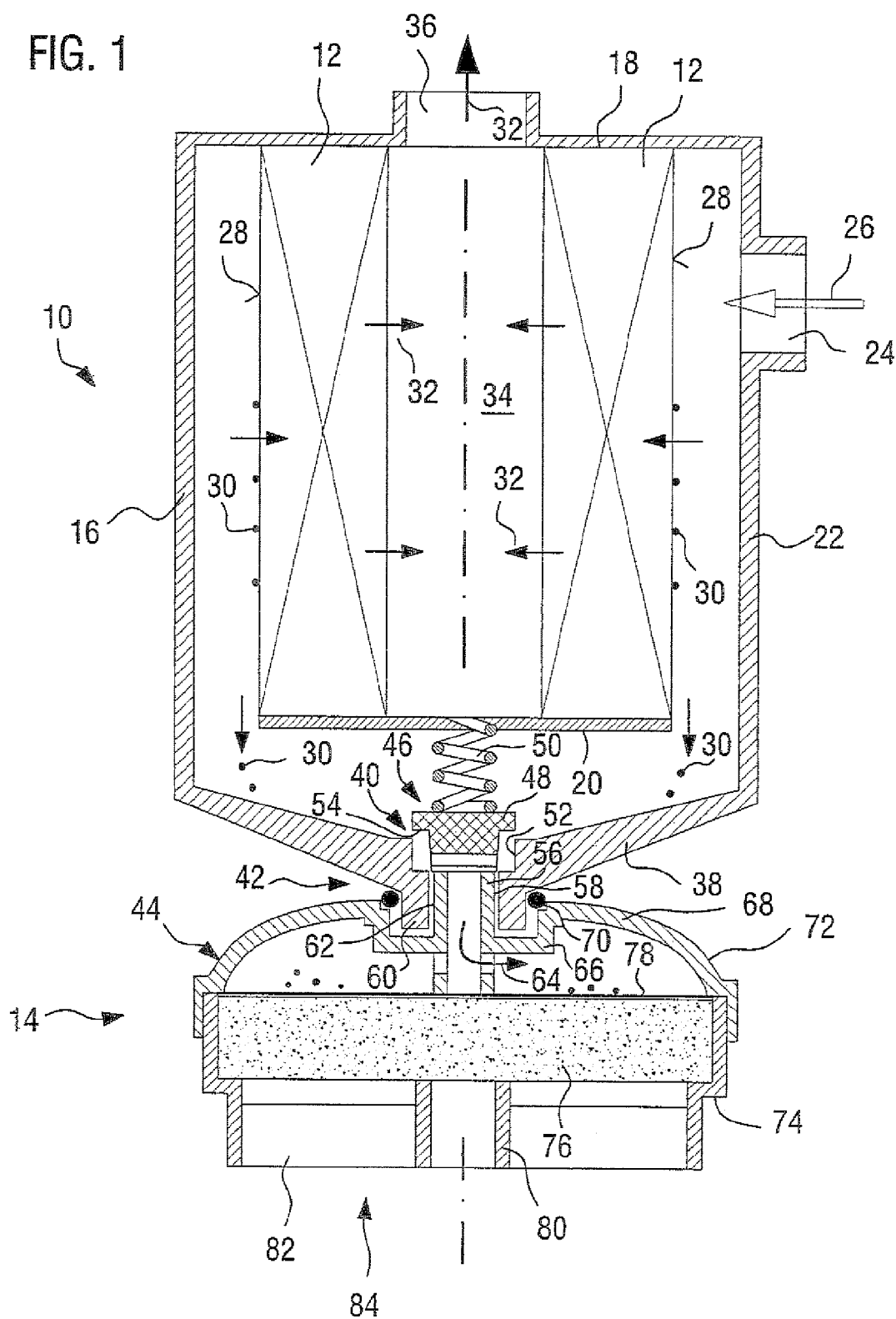
FIG. 1 shows a longitudinal section through a first exemplary embodiment of a fuel filter according to the invention.
Figure 2:
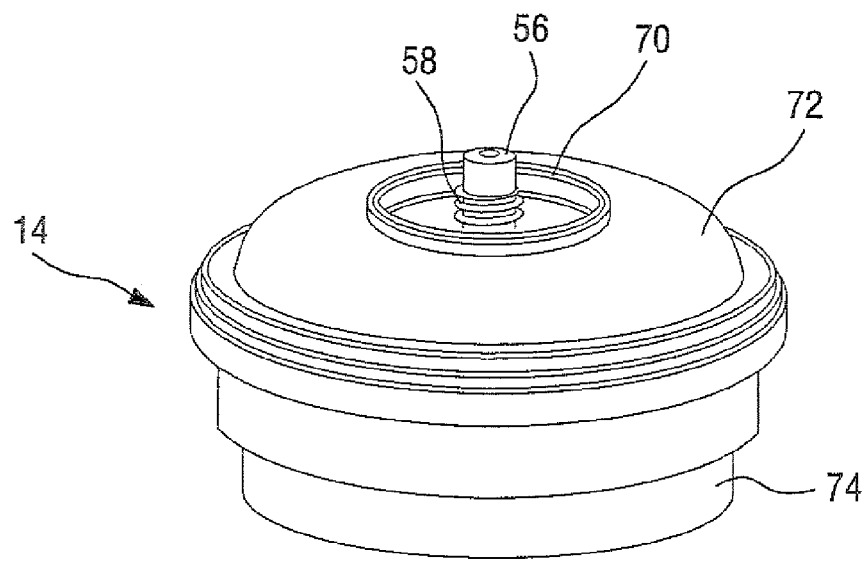
FIG. 2 is a perspective side view from above of a water drainage unit of the fuel filter according to FIG. 1.
Figure 3:
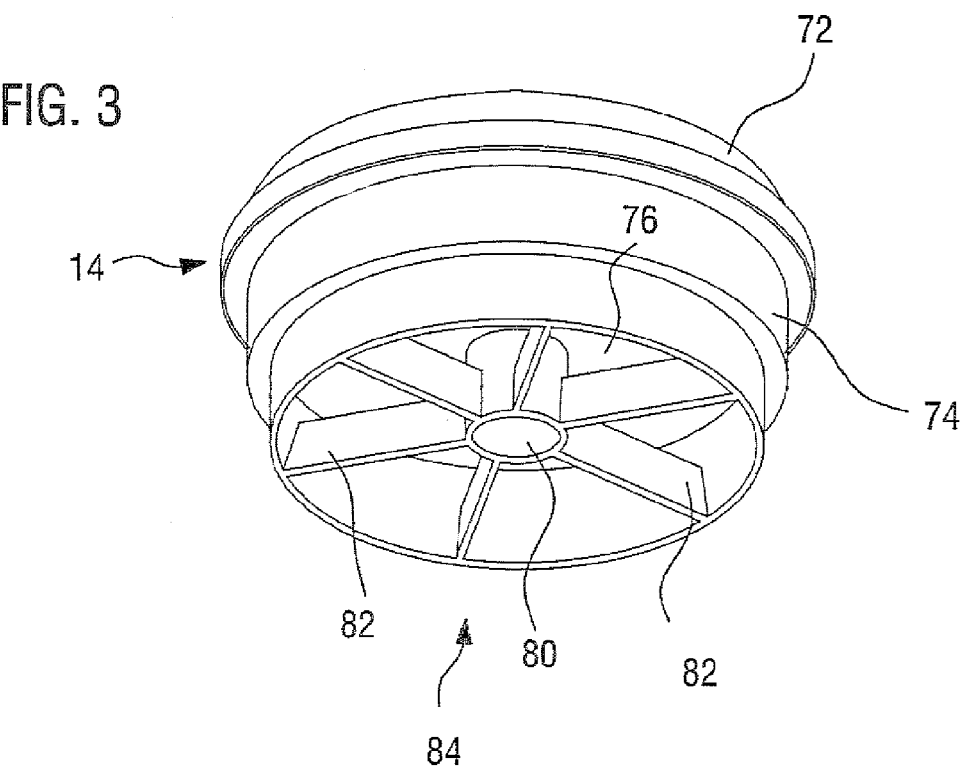
FIG. 3 is a perspective side view from below of the water drainage unit according to FIG. 2.

FIGS. 1 through 3 show a fuel filter 10 that is composed of a filter element 12 and a water drainage unit 14. The water drainage unit 14 is embodied in the form of a stand-alone module, which, as will be explained in detail below, can be separated from the filter element 12 and individually replaced as a part of a repair or maintenance procedure.

The filter element 12 is essentially hollow and cylindrical and is situated in an essentially hollow, cylindrical filter housing 16. The filter element 12 rests with one of its end surfaces against a cover surface 18 of the filter housing 16 and is closed at its opposite bottom surface 20 so that no fuel can flow from the housing 16 without passing through the filter body 12.

The circumference surface 22 of the essentially cylindrical filter housing 16 is provided with a fuel inlet 24 through which unpurified fuel 26 can be supplied. The fuel thus conveyed into the filter housing 16 strikes a circumference surface 28 of the filter element 12 and dirt particles that are not shown and water particles 30 are separated from the unpurified fuel 26 there so that only purified fuel 32 travels into an inner chamber 34 of the essentially hollow, cylindrical filter element 12. The purified fuel 32 then flows out of the fuel filter 10 through a fuel outlet 36 situated in the cover surface 18 of the filter housing 16 and travels to an internal combustion engine that is not shown in detail.

The eliminated or separated water particles 30 settle inside the cylindrical filter housing 16 and fall to the bottom 38 of it. A water outlet 40 is provided there, equipped with a coupling mechanism 42 for a water drainage unit housing 44. The water outlet 40 can optionally be connected to a valve 46 whose valve disk 48 is braced against the bottom surface 20 of the filter element 12 by means of a valve spring 50 and is pushed inside a disk guide 52 toward a valve seat 54 encompassing the water outlet 40. In the arrangement depicted in FIG. 1, in which the water drainage unit housing 44 is coupled to the filter housing 16, the valve disk 48 is lifted away from the valve seat 54 with the aid of a drift 56 and the valve 46 is thus held in an open state.

The drift 56 is provided with an external thread 58, which is screwed into a sleeve 60 equipped with an internal thread 62. The sleeve 60 is provided at the bottom 38 of the filter housing 16, encompassing the water outlet 40. When the valve 46 is open, this creates a flow path 64 out of the filter housing 16 and into the water drainage unit housing 44. In order to seal this flow path 46 in relation to the outside at the coupling point between the filter housing 16 and the water drainage unit housing 44, a cover surface 68 of the water drainage unit housing 44 is provided with a recess 66 into which the sleeve 60 protrudes and at the outer edge of which a sealing ring 70 is provided. The sealing ring 70 thus situated produces a seal between the cover surface 68 and the outside of the sleeve 60.

The water drainage unit housing 44 is provided with an essentially hood-shaped upper part 72 and an essentially annular bottom part 74, which are connected to each other by means of an extrusion coating. Between the upper part 72 and the lower part 74, a disk-shaped porous element 76 is provided, which serves as a support for a semipermeable hydrophilic membrane 78 made of an organic and/or inorganic material such as cellulose. The semipermeable hydrophilic membrane 78 is permeable for water only, whereas it holds back fuel particles and hydrocarbon particles.

The disk-shaped porous element 76 is manufactured, for example, out of sintered metal such as $\gamma$-$Al_2O_3$ ceramic and, together with the semipermeable hydrophilic membrane 78 mounted on its upper surface, is held by the drift 56 provided on the cover surface 68 of the water drainage unit housing 44 and is supported on its underside with the aid of a support sleeve 80 that is held in the center of the bottom part 74 by a total of six essentially radially extending struts 82. With this kind of support of the semipermeable hydrophilic membrane 78 by means of the disk-shaped porous element 76 and the support sleeve 80, the semipermeable hydrophilic membrane 78 is permanently secured in a mechanically stable fashion and assures a good crash protection.

In addition, between the struts 82, a region 84 is formed, which is open toward the outside and permits the water to evaporate that has passed through the semipermeable hydrophilic membrane 78 and been transported outward, away from this membrane by the disk-shaped porous element 76.

Figure 4:
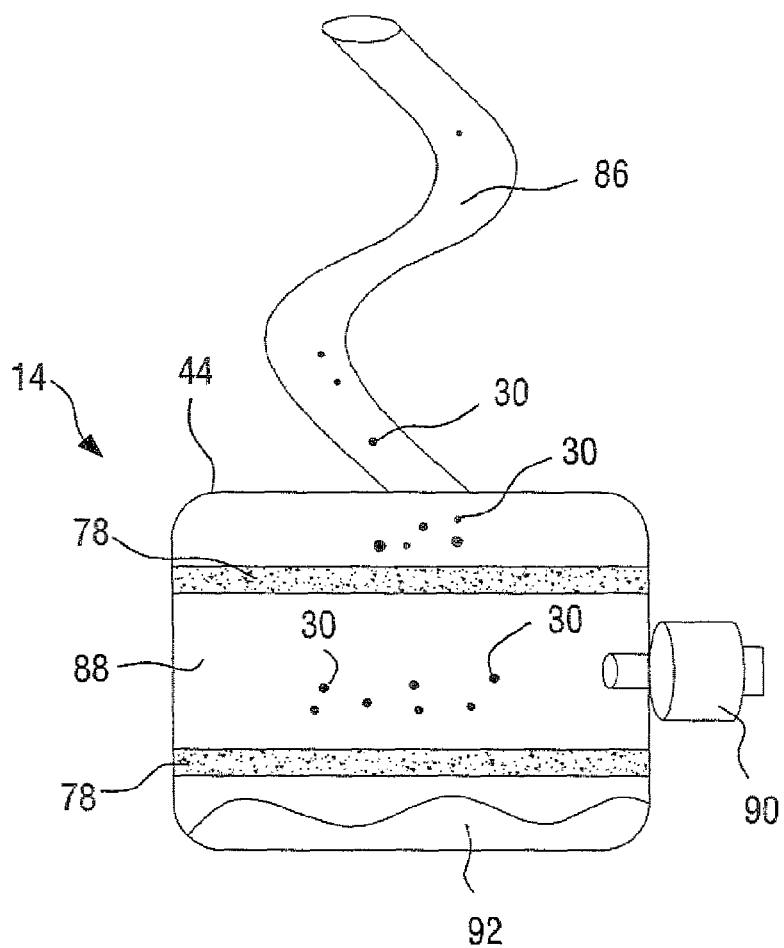
FIG. 4 is a very schematic longitudinal section through a second exemplary embodiment of a water drainage unit of a fuel filter according to the invention.

FIG. 4 shows an exemplary embodiment of a water drainage unit 14 that is likewise provided with a stand-alone water drainage unit housing 44. The water drainage unit housing 44, however, is not coupled to a filter housing directly as in the exemplary embodiment according to FIGS. 1 through 3; instead, a hose 86 is provided through which a line connection for the separated water is produced, leading from a filter element, not shown, to the water drainage unit 14. Inside the water drainage unit housing 44 according to FIG. 4, there are a total of two semipermeable hydrophilic membranes 78, which are oriented essentially perpendicular to the flow direction of the water supplied through the hose 86. In this case, the semipermeable hydrophilic membranes 78 delimit an intermediate space 88 in the water drainage unit housing 44 into which water can flow only via the upper of the two semipermeable hydrophilic membranes 78.

A detector or sensor 90 for detecting fuel or hydrocarbon residues protrudes into the intermediate space 88. The sensor 90 situated in this fashion reacts if more than just separated water has gotten into the intermediate space 88, i.e. if fuel particles are also contained therein. It thus indicates a malfunction of the upper of the two semipermeable hydrophilic membranes 78 and therefore makes it possible to react appropriately. Thus, for example, the upper of the two semipermeable hydrophilic membranes 78 could be ruptured, whereupon the water drainage unit 14 would then have to be appropriately repaired or replaced. In the event of such a damage, the lower of the two semipermeable hydrophilic membranes 78 prevents an undesirable escape of fuel from the water drainage unit 14 according to FIG. 4.

In addition, beneath the lower of the two semipermeable hydrophilic membranes 78, a discharge device 92, not shown in detail, is provided for the separated water, which can be embodied in a fashion similar to that of the water discharge depicted in FIG. 1.

Figure 5:
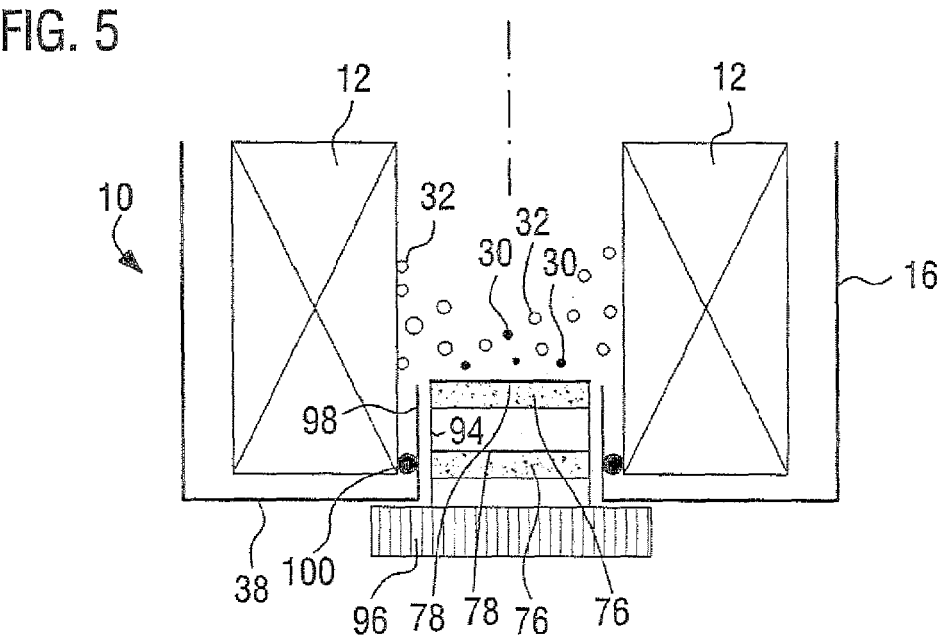
FIG. 5 is a very schematic longitudinal section through a third exemplary embodiment of a fuel filter according to the invention, with a filter element and a water drainage unit.

FIG. 5 shows an exemplary embodiment of a fuel filter 10 in which, in a fashion similar to that of the exemplary embodiment according to FIGS. 1 through 3, the filter element 12 and the water drainage unit 14 are embodied as separate modules. In the exemplary embodiment according to FIG. 5, however, the water drainage unit 14 is not situated underneath the filter element 12, but is instead integrated into its inner chamber 34 and is situated therein on the clean side of the filter element 12.

In a fashion similar to that of the exemplary embodiment according to FIG. 4, the water drainage unit 14 according to FIG. 5 is provided with two semipermeable hydrophilic membranes 78. The membranes 78 are situated essentially parallel to each other in a hollow, cylindrical cartridge 94, the underside of which is provided with a discharge device 96 for separated water. The semipermeable hydrophilic membranes 78 in this case are once again supported by a disk-shaped porous element 76 and the discharge device 96 is embodied as a section or region that is open toward the outside and is provided with a fine-meshed screen.

The cartridge 94 is screwed into a sleeve section 98 provided at the bottom 38 of the filter housing 16. The cartridge 94 in this case is connected to the sleeve section 98 in a fluid-tight fashion. On the side of the sleeve section 98 oriented toward the interior of the filter housing 16, a sealing ring 100 is provided, which adjoins the filter element 12 so that its clean side and dirty side are separated from each other.

The foregoing relates to a preferred exemplary embodiment of the invention, it being understood that other variants and embodiments thereof are possible within the spirit and scope of the invention, the latter being defined by the appended claims.

The invention claimed is:

1. A fuel filter comprising a filter element for filtering out particles and water from a fuel flowing through the fuel filter, a stand-alone water drainage unit for conveying filtered-out water out of the fuel filter, and means operably connecting the water drainage unit and the filter element whereby the water drainage unit may be separated from the filter element as needed,
   wherein the water drainage unit comprises a semipermeable membrane that is permeable to water, and a support member supporting the membrane, and
   wherein the semipermeable membrane rests against the support member, and the support member simultaneously constitutes a porous element for the evaporation of the separated water.

2. The fuel filter according to claim 1, wherein the water drainage unit and the filter element have separate housings, and wherein the water drainage unit housing has the capacity to be coupled to the housing of the filter element.

3. The fuel filter according to claim 1, wherein the water drainage unit comprises a housing that is open toward the outside in the region of the porous element.

4. The fuel filter according to claim 3, wherein, in the installed position, the water drainage unit comprises a region that is open to the outside, the open region being situated on the underside of the water drainage unit.

5. The fuel filter according to claim 1, wherein the support member is supported on an underside thereof by a support sleeve.

* * * * *